(12) United States Patent
Sarkar

(10) Patent No.: US 7,865,386 B2
(45) Date of Patent: Jan. 4, 2011

(54) APPOINTMENT SCHEDULING SYSTEM

(76) Inventor: Shyamal K. Sarkar, 7 Pineglen Dr., Blauvelt, NY (US) 10913

( * ) Notice: Subject to any disclaimer, the term of this patent is extended or adjusted under 35 U.S.C. 154(b) by 544 days.

(21) Appl. No.: 11/445,695

(22) Filed: Jun. 3, 2006

(65) Prior Publication Data

US 2007/0282654 A1 Dec. 6, 2007

(51) Int. Cl.
*G06F 9/46* (2006.01)
(52) U.S. Cl. .................................. 705/8; 7/9
(58) Field of Classification Search ........................ None
See application file for complete search history.

(56) References Cited

U.S. PATENT DOCUMENTS

| | | | | |
|---|---|---|---|---|
| 5,772,585 | A * | 6/1998 | Lavin et al. .................. | 600/300 |
| 5,855,006 | A * | 12/1998 | Huemoeller et al. ............ | 705/9 |
| 6,314,556 | B1 * | 11/2001 | DeBusk et al. ............... | 717/107 |
| 6,345,260 | B1 * | 2/2002 | Cummings et al. ............. | 705/8 |
| 6,389,454 | B1 * | 5/2002 | Ralston et al. ............... | 709/204 |
| 6,961,418 | B1 * | 11/2005 | Thygeson et al. ...... | 379/210.01 |
| 7,080,025 | B2 * | 7/2006 | Mifune et al. .................. | 705/9 |
| 7,188,073 | B1 * | 3/2007 | Tam et al. ...................... | 705/9 |
| 7,275,220 | B2 * | 9/2007 | Brummel et al. ............ | 715/804 |
| 7,337,123 | B2 * | 2/2008 | Dvorak et al. .................. | 705/8 |
| 7,412,395 | B2 * | 8/2008 | Rowlandson .................. | 705/2 |
| 7,472,181 | B2 * | 12/2008 | Hollinger et al. ............ | 709/224 |
| 7,620,562 | B2 * | 11/2009 | Henry et al. .................. | 705/9 |
| 7,716,072 | B1 * | 5/2010 | Green et al. .................... | 705/3 |
| 2002/0059082 | A1 * | 5/2002 | Moczygemba ................ | 705/3 |
| 2002/0116220 | A1 * | 8/2002 | Glazier .......................... | 705/2 |
| 2002/0131572 | A1 * | 9/2002 | Paradis ....................... | 379/200 |
| 2002/0156672 | A1 * | 10/2002 | Burko .......................... | 705/9 |
| 2002/0177757 | A1 * | 11/2002 | Britton ..................... | 600/300 |
| 2002/0191035 | A1 * | 12/2002 | Selent ........................ | 345/866 |
| 2003/0005055 | A1 * | 1/2003 | Ralston et al. ............. | 709/204 |
| 2003/0120512 | A1 * | 6/2003 | Dengler ......................... | 705/2 |
| 2003/0208391 | A1 * | 11/2003 | Dvorak et al. .................. | 705/8 |
| 2004/0019501 | A1 * | 1/2004 | White et al. .................... | 705/2 |
| 2004/0039596 | A1 * | 2/2004 | Geertsen et al. ................ | 705/1 |
| 2004/0039626 | A1 * | 2/2004 | Voorhees ....................... | 705/9 |
| 2004/0158486 | A1 * | 8/2004 | Nudd et al. .................... | 705/8 |
| 2004/0199412 | A1 * | 10/2004 | McCauley ..................... | 705/7 |

(Continued)

OTHER PUBLICATIONS

Lesins R. What Works. Health Management Technology. (2003). Nelson Publishing Inc. SpectraSoft White Paper.*

(Continued)

*Primary Examiner*—Romain Jeanty
*Assistant Examiner*—Brett Feeney
(74) *Attorney, Agent, or Firm*—Ash Tankha

(57) ABSTRACT

Disclosed herein is a method and system for alerting users of an appointment system of any change in an appointment schedule between practitioners and clients. If a user registered in the appointment system chooses to schedule an appointment, the user confirms the appointment by sending a conformation message to the message handling module. The appointment system, at predetermined intervals of time compares the status of preferred schedule of appointment against the existing schedule of appointments and if there is any change in the status of scheduled appointment, the change is stored in the central database and an alert message generated. The alert messages are sent via email or short message services (SMS) or a prerecorded voice message on their wireline phone to users affected by the change in schedule and who have registered for the appointment service.

14 Claims, 16 Drawing Sheets

U.S. PATENT DOCUMENTS

| | | | |
|---|---|---|---|
| 2004/0268210 A1* | 12/2004 | Gul | 715/500 |
| 2005/0027580 A1* | 2/2005 | Crici et al. | 705/8 |
| 2005/0060201 A1* | 3/2005 | Connely et al. | 705/2 |
| 2005/0171818 A1* | 8/2005 | McLaughlin | 705/3 |
| 2005/0234741 A1* | 10/2005 | Rana et al. | 705/2 |
| 2005/0287508 A1* | 12/2005 | Johnson et al. | 434/350 |
| 2006/0026051 A1* | 2/2006 | Rose | 705/8 |
| 2006/0031097 A1* | 2/2006 | Lipscher et al. | 705/2 |
| 2006/0047552 A1* | 3/2006 | Larsen et al. | 705/8 |
| 2006/0053044 A1* | 3/2006 | Kurian et al. | 705/9 |
| 2006/0143060 A1* | 6/2006 | Conry et al. | 705/8 |
| 2006/0161468 A1* | 7/2006 | Larsen et al. | 705/8 |
| 2006/0173725 A1* | 8/2006 | Abraham et al. | 705/8 |
| 2006/0271399 A1* | 11/2006 | Robson et al. | 705/2 |
| 2007/0226010 A1* | 9/2007 | Larsen | 705/2 |
| 2007/0282656 A1* | 12/2007 | Battcher et al. | 705/8 |

OTHER PUBLICATIONS

Paperless Cure. Health Management Technology. Jul. 2001 22(7): 26-27.*

Scheduling version 5.3 Primary Care Management Module. Installation Guide/release Notes. Sep. 1998. Department of Veterans Affairs. VISA Software Development Technical Services.*

Mercando AD (1997). Appointment Scheduling on Computer. PACE. 20: 1860-1862.*

Snyder TL (1995). Integrating technology into dental practices. J Am Dent Assoc. 126: 171-178.*

Net-RIS (2004). Referring Physicians Web Portal Users Guide. On-Line Scheduler and report Viewer for Referring Physicians.*

Dodero MA; Gianuzzi V; Minuto F and Guida M (2000). Mobile computing in a hospital: the Ward-In-Hand project. ACM. 1-11.*

* cited by examiner

APPOINTMENT SCHEDULING SYSTEM

BACKGROUND

This invention, in general, relates to an on-line appointment system connected to the internet wherein the status or schedule of appointments between two or more parties, for example, a practitioner and clients or clients are monitored in real time, and alert messages are sent to by one party to the other party, for example by the practitioner and clients in the event of a change in the appointment schedule.

In an appointment based meeting system, if the practitioner were to arrive late or if a client spends excessive time with a practitioner, the entire appointment schedule gets pushed out. The appointment system currently used by practitioners are not efficient at advising clients regarding a delay in their appointments, or the rescheduled appointment, or the ability of the appointment system to inform the clients regarding the rescheduled appointment before the clients leave their home or office premises for the practitioner's office. There is an unmet market need for a notification system that informs the clients in a timely manner the rescheduled appointment with the practitioner.

Thus, there is an unmet market need to automatically monitor the schedule of appointments between a practitioner and clients or clients and send alerts to the practitioners and customers or clients in real-time of the change in appointments.

SUMMARY OF THE INVENTION

Disclosed herein is a method and system for automatically alerting in real time the users of an appointment system, a change in the appointment schedule between practitioners and customers or clients. The practitioners, customers and clients, herein collectively referred to as users, are granted access to a central database by verifying the login information provided by the users for the purpose of scheduling an appointment. The users register themselves using a user registration module and the information provided by the user is stored in a central database. Once a user registers for the appointment system, and if the user chooses to schedule an appointment, then the appointment is confirmed by sending a confirmation message to the respective user by a message-handling module. The appointment system, at predetermined intervals of time will compare the status of preferred schedule of appointment to the existing schedule of appointments and if there is any change in the status of scheduled appointments, the change in the schedule of appointments is updated in the central database and an alert message is generated. The alert messages are sent to users who have registered for such a service and are informed via email or short messaging services (SMS) or a prerecorded voice message on their wireline phone.

The method and system disclosed herein alerts the users on a real time basis by constantly monitoring the central database for any changes in the appointment schedule. If there is change in the status or schedule of appointments, the system sends out a short message, or a prerecorded voice message, or email via internet, or the telephone network to the respective user informing about the change in the appointment schedule. Thereby, the user is made aware of the changes in the appointment schedule well in advance of the appointment time.

The method and system disclosed herein enables a user to add or cancel an appointment on a real time basis without having to come in person to make a change to a scheduled appointment. A user can add, cancel or reschedule an appointment using the appointment book provided to the users of the appointment system. This new appointment information will be stored and updated in the central database for the other users to view. An alert message will be generated and delivered to the users affected by the change in appointment schedule informing them about the addition or cancellation of the scheduled appointment via email or SMS or a prerecorded voice message.

The method and system of this invention enables user to change the schedule of an appointment. The changes to the appointment schedule are uploaded and stored in the centralized database and a confirmation message is sent to the respective users. Thus, the affected users are informed in real time about any changes in their appointment schedule.

The method and system disclosed herein allows user with an internet connection or a mobile device to remotely access their appointment book. The schedules appointments are stored in a centralized database located in a server connected to the internet.

BRIEF DESCRIPTION OF THE DRAWINGS

The foregoing summary, as well as the following detailed description of preferred embodiments, is better understood when read in conjunction with the appended drawings.

For the purpose of illustrating the invention, there is shown in the drawings exemplary constructions of the invention; however, the invention is not limited to the specific methods and instrumentalities disclosed.

DETAILED DESCRIPTION OF THE INVENTION

Figure 1A:
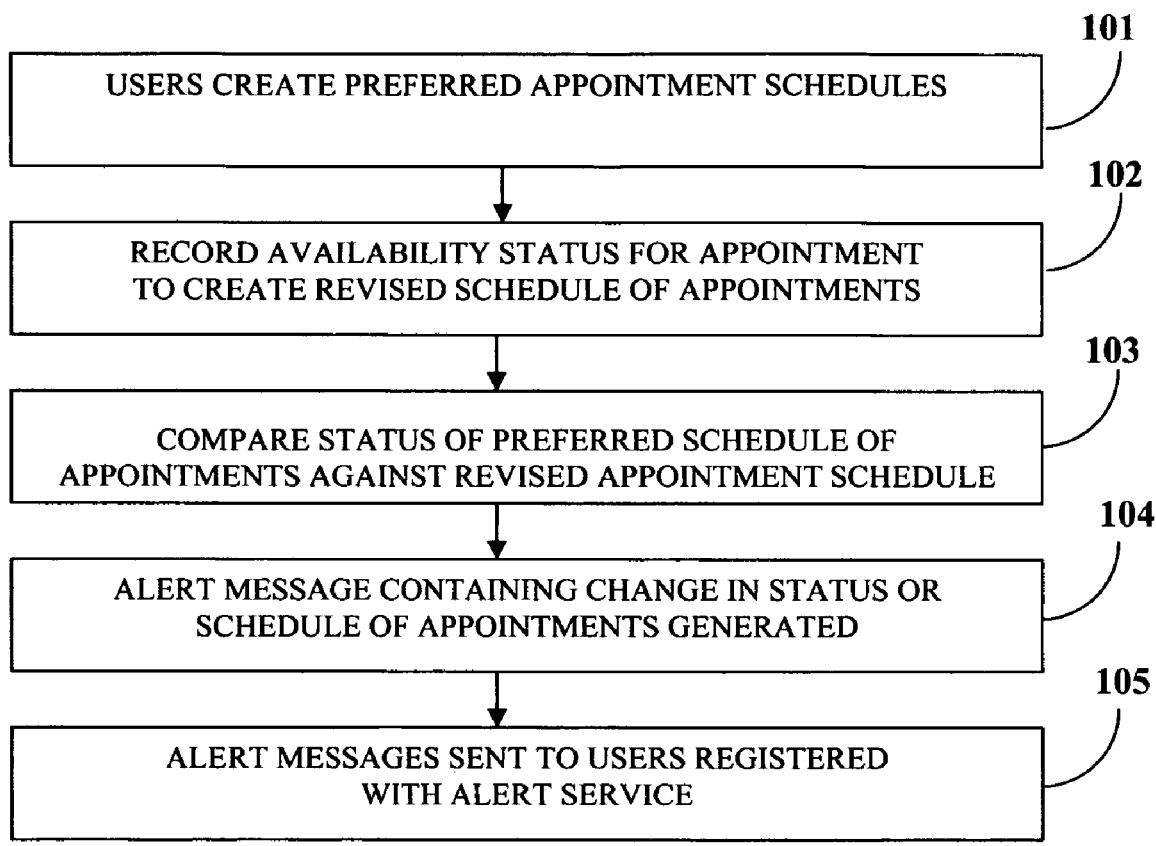
FIG. 1A illustrates a method for alerting users of an appointment system of changes in the appointment schedule.

FIG. 1A illustrates a method for alerting users of an appointment system of changes in the appointment schedule. The users of the appointment system comprise practitioners, clients and administrators. An example of an appointment scheduled under the method disclosed herein is an appointment scheduled between a practitioner and a client, which would comprise information on the time and subject of meeting. An example of an administrator would be the administrative assistant at the practitioner's office who is responsible for managing the practitioner's schedule. The practitioner or the client creates a preferred appointment schedule 101 by inputting into the appointment system the schedule of appointments, and the appointment time of a client. For example, consider the case where client John Smith schedules a meeting at 11:00 AM with a practitioner. Within a predetermined period from the time of the preferred appointment time, the availability status of the users of the appointment system who are scheduled for an appointment within the predetermined period are recorded into the appointment system 102. This creates a revised schedule of appointments. For example, assume at 9:00 AM on the day of the appointment, the administrative assistant in the practitioner's office observes that the appointments on the practitioners schedule are running late by 45 minutes. The administrative assistant logs into the online appointment system and enters information on this 45-minute delay, as a result of which the remaining appointments for that day are rescheduled and pushed back by 45 minutes. The appointment system automatically compares the status of preferred schedule of appointments, i.e., the earlier scheduled appointment against the revised schedule of appointments at predetermined intervals of time 103, and generates alert messages 104. The alert messages are automatically sent by the appointment system to each affected user indicating the change in status or the schedule of the user's appointment 105. In the current example, all the clients, including John Smith, who were scheduled to meet the practitioner between 9:00 AM and 12:00 PM are sent a short message service and/or e-mail notifying that their appointments have been rescheduled to a point 45 minutes later than their earlier scheduled appointment time.

Figure 1B:
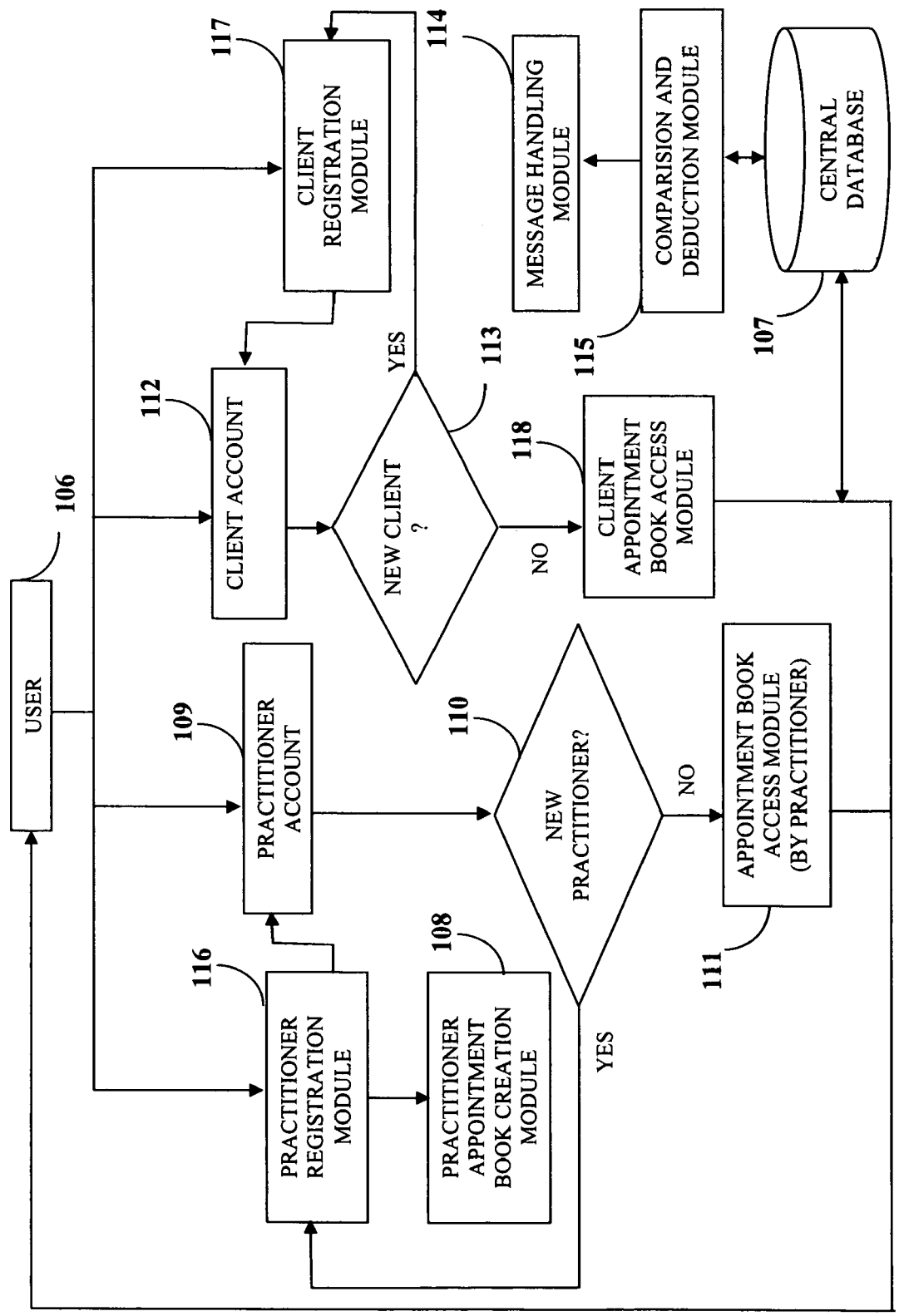
FIG. 1B illustrates the web-based appointment system.

FIG. 1B illustrates the web based appointment system for alerting the users of an appointment system of any changes in the appointment schedule. An appointment module creates preferred appointment schedules for the users 106 in the appointment system. Depending on whether the user 106 is a practitioner or a client, the user 106 is directed to either the practitioner registration module 116 or the client registration module 117 respectively. A new practitioner 110 is prompted to create a practitioner appointment book in the practitioner appointment book creation module 108. If the practitioner has already registered with the online appointment system, upon successful login, the practitioner is directed to the practitioner account 109. The practitioner can access the practitioner appointment book using the practitioner appointment book access module 111. If the user 106 who has successfully logged into the online appointment system is a client, the client is granted access to the client account 112. If the client is a new client 113 who has not yet registered with the appointment system, the client is required to register with the appointment system using the client registration module 117. After the client has successfully logged into online appointment system, the client is directed to the client appointment book using the client appointment book access module (CAAM) 118. The appointment module records the availability status of the users 106 in the appointment systems who are scheduled for an appointment within a predetermined period of time. A comparison and deduction module 115 compares the status of preferred schedule of appointments against revised schedule of appointments at predetermined intervals of time. The steps of comparing the status of the preferred schedule and revised schedule of appointments is performed automatically by the appointment system as soon as the status of the appointments is updated in the appointment system by a user 106. The message-handling module 114 generates an alert message that contains the change in the status of schedule of appointments, and sends the alert messages to affected users. A central database 107 located on the internet stores user 106 and appointment related information. The registration module comprises a practitioner registration module 116 and a client registration module 117 that register the client and practitioner respectively. All the personal details, preferences and schedule of appointments provided by the users are stored in the central database 107.

The appointment module of the online appointment system records the availability status over a predetermined period of time for each user scheduled for the preferred appointment. Based on a change in the preferred appointment schedule of one or more of the users, the online appointment system reschedules appointments of each user and creates a revised appointment schedule. The online appointment system automatically compares the status of the preferred appointment schedule against the revised appointment schedule at predetermined intervals of time. Depending on the outcome of the comparison, alert messages containing the change in the status or schedule of appointments are automatically generating by the online appointment system. The automatically generated alert messages are communicated to the affected users by the message-handling module using a short message service (SMS), a pre-recorded voice message, an electronic mail or a phone call made using a telephone.

Figure 2:
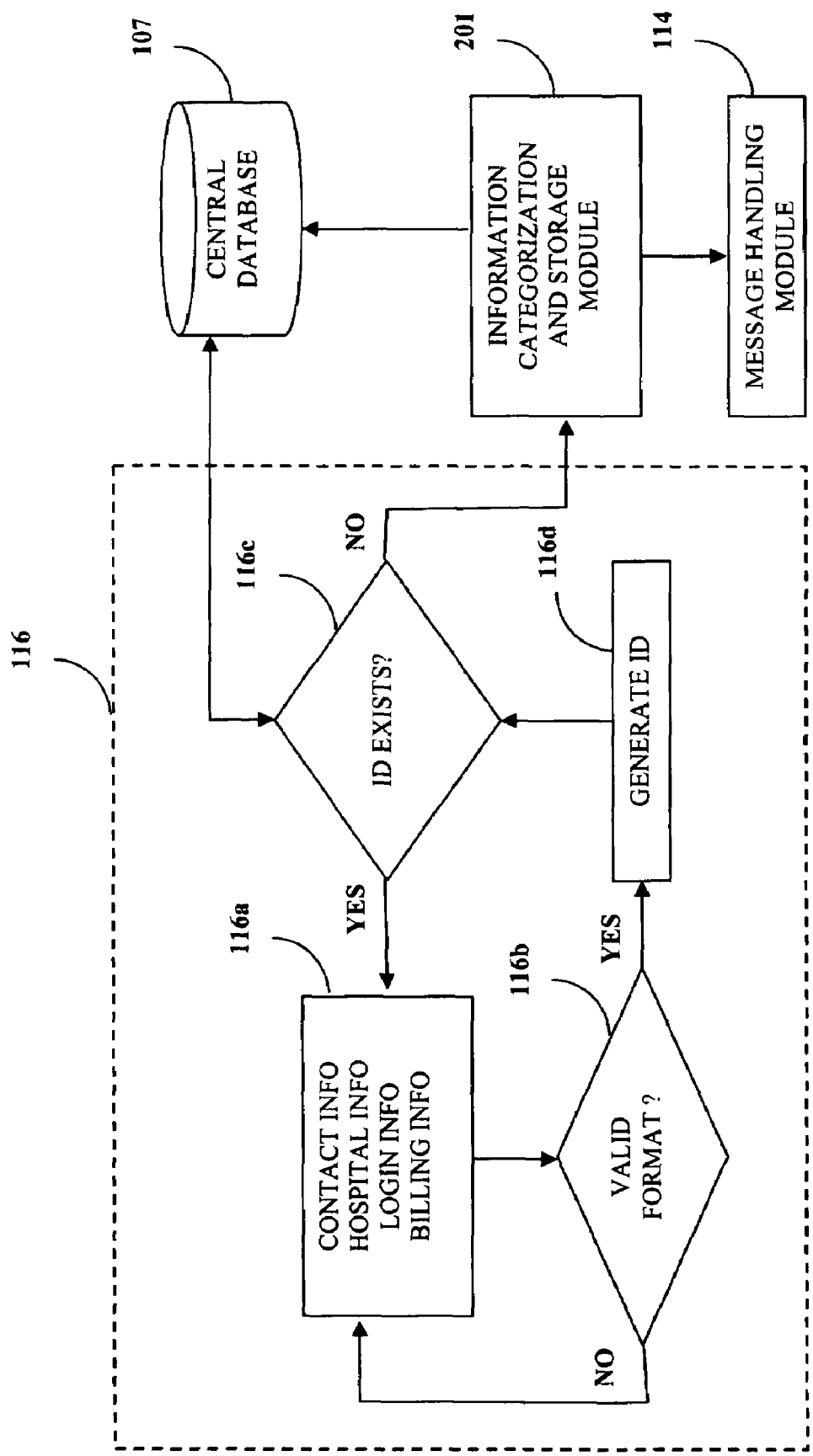
FIG. 2 illustrates the practitioner registration module (PRM).

FIG. 2 illustrates the practitioner registration module (PRM) 116. The practitioner registration module 116 receives the registration information in a system specified format from the practitioner 116a, verifies if the information provided is an acceptable format 116b, generates a unique username from the provided information 116d, verifies if the selected username is unique 116c, stores the information for the registered practitioner in the central database 107, and sends the registration information 201 to the message handling module 114.

The PRM 116 checks 116c with the central database 107 to verify that no other user with the same username exists to prevent the duplication of registration in the central database 107. Upon verifying that the username is unique 116c, the PRM 116 generates confirmation information indicating the successful confirmation of the registration process and sends the confirmation message to the message-handling module 114. The message-handling module 114 sends a message, for example, an email, short message service (SMS) via a mobile device or an automated voice message to the practitioner in order to confirm the registration.

Figure 3:
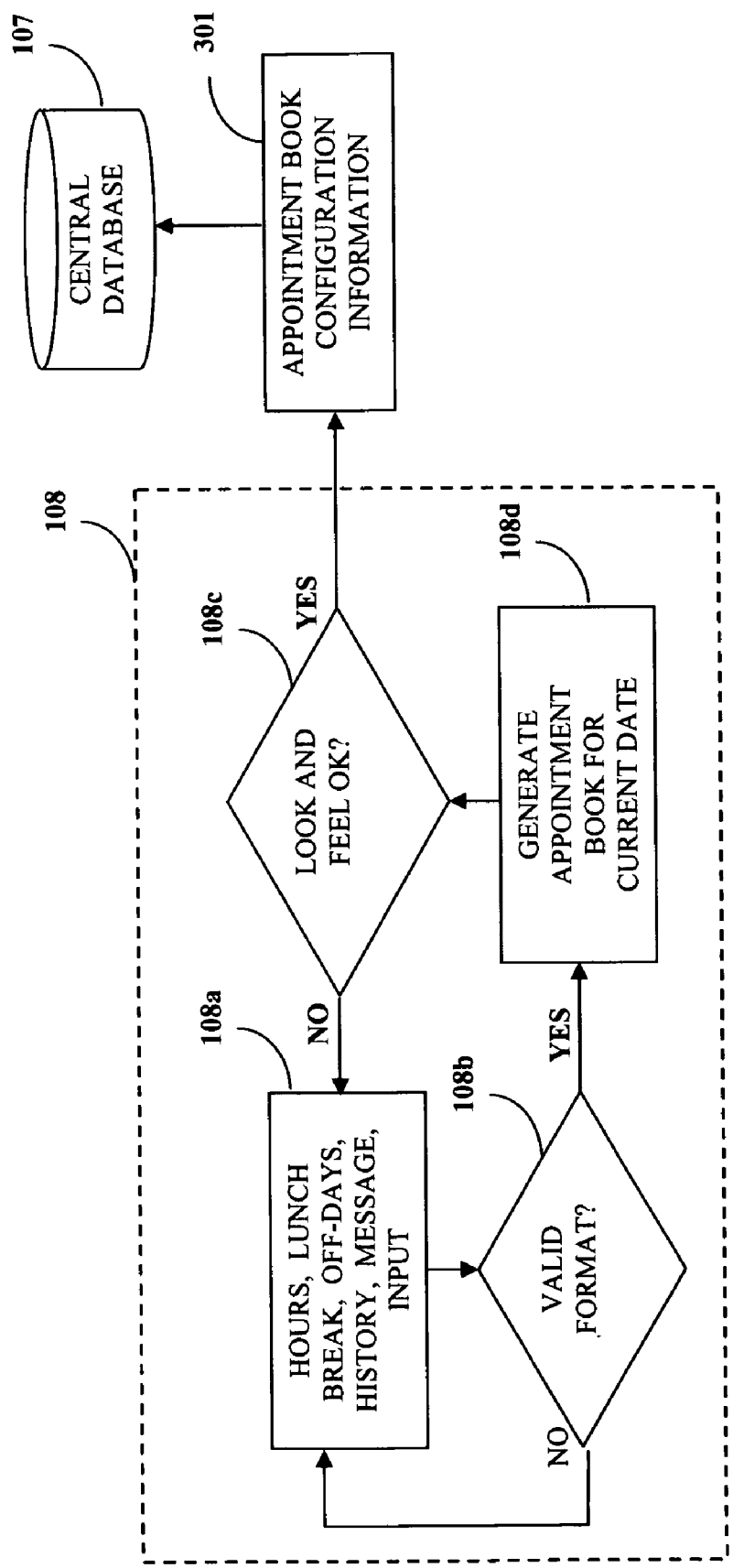
FIG. 3 illustrates the appointment book creation module (ACM).

FIG. 3 illustrates the appointment book creation module (ACM) 108. The ACM 108 assists the practitioner in creating an appointment book based on information provided by the practitioner. The ACM 108 accepts the following information from the practitioner: choice of working hours, lunch break hour's selection, off-days selection (Saturday/Sunday/Holidays), history keeping (30-60-90) days, color change for the appointment book, messages such as special announcements to be displayed to the clients, etc., 108a.

After the ACM 108 receives information from the practitioner 108a in a predetermined format 108b, it generates an appointment book layout 108d for the practitioner to review and makes corrections 108c. If the practitioner is not satisfied with the created appointment book layout, the ACM 108 redirects the practitioner to start the configuration process from the beginning 108a. If the practitioner is satisfied with the appointment book layout, the ACM configuration information 301 is saved by the ACM 108 in the central database 107.

Figure 4:
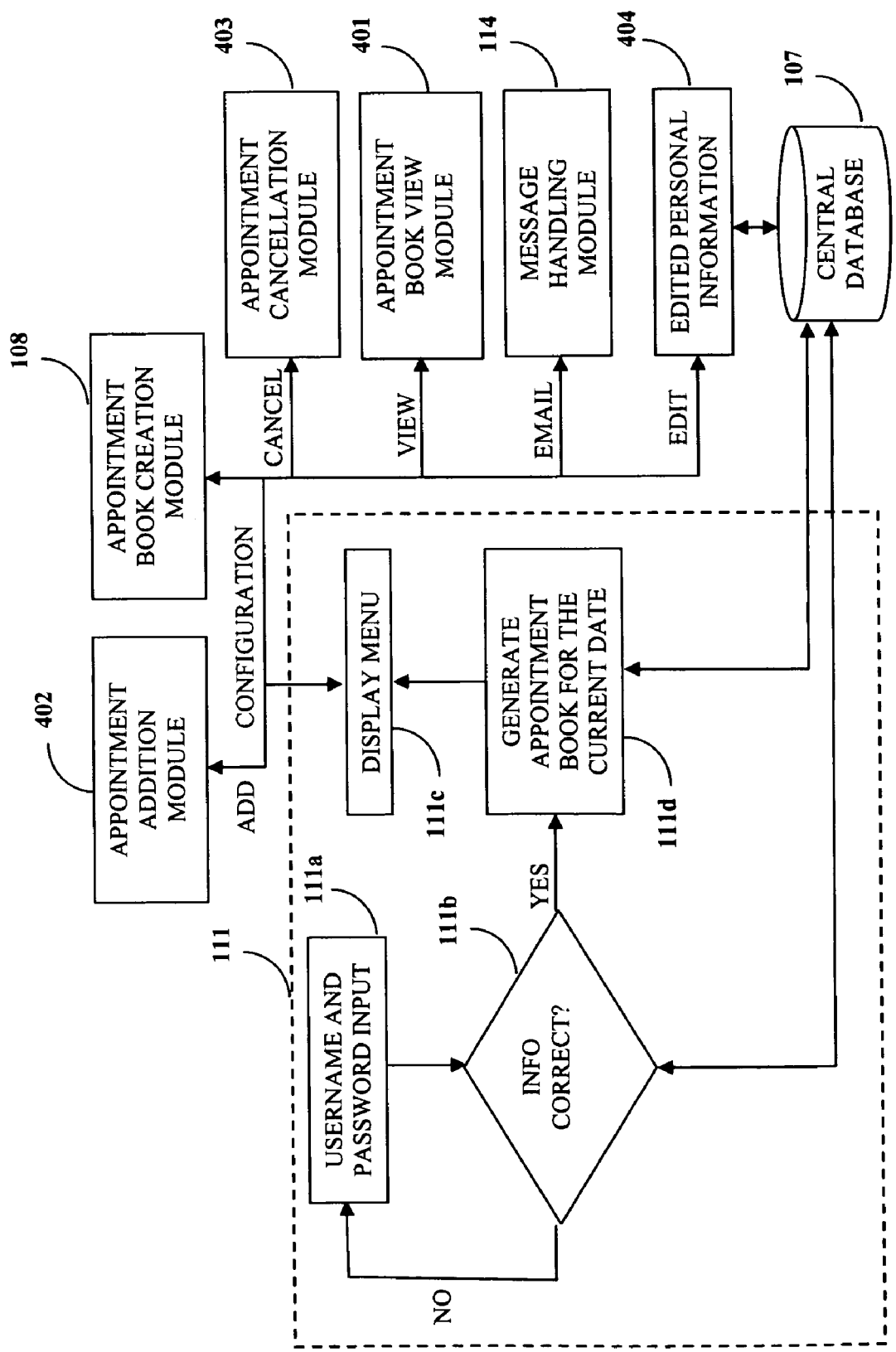
FIG. 4 the practitioner appointment book access module (PAAM)

FIG. 4 illustrates the practitioner appointment book access module (PAAM) 111. The appointment book access module 111 allows the practitioner to login to the appointment book, view the contents of the appointment book, edit personal registration information, download appointment history, view the calendar, add or cancel appointments and view client information.

The practitioner gains access to the PAAM 111 by inputting the username and password 111a. The PAAM 111 verifies the username and password 111b by consulting the central database 107. If the login information, i.e., username and password provided by the practitioner is incorrect, the PAAM 111 prompts the practitioner to reenter the correct login information to grant access to the appropriate appointment book and generates a view of the appointment book for that particular day 111d, and displays it to the user in a display menu 111c. Optionally, for enhanced security, the PAAM 111 may restrict access to the appointment book by blocking login attempts after a predetermined number of successive unsuccessful login attempts. If the login information provided is correct, the PAAM 111 grants access to the appointment book corresponding to the appropriate practitioner. Upon successful login, the PAAM 111 generates a view of the appointment book for that particular day 111d and presents a display menu 111c using which the practitioner can change the registration details 404, view current appointments, add appointments by sending information to the appointment addition module 402, cancel appointments by sending information to the appointment cancellation module 403, view details of clients using the appointment view module 401, and send emails to clients using the message handling module 114. Any change made to the data is stored in the central database 107.

Figure 5:
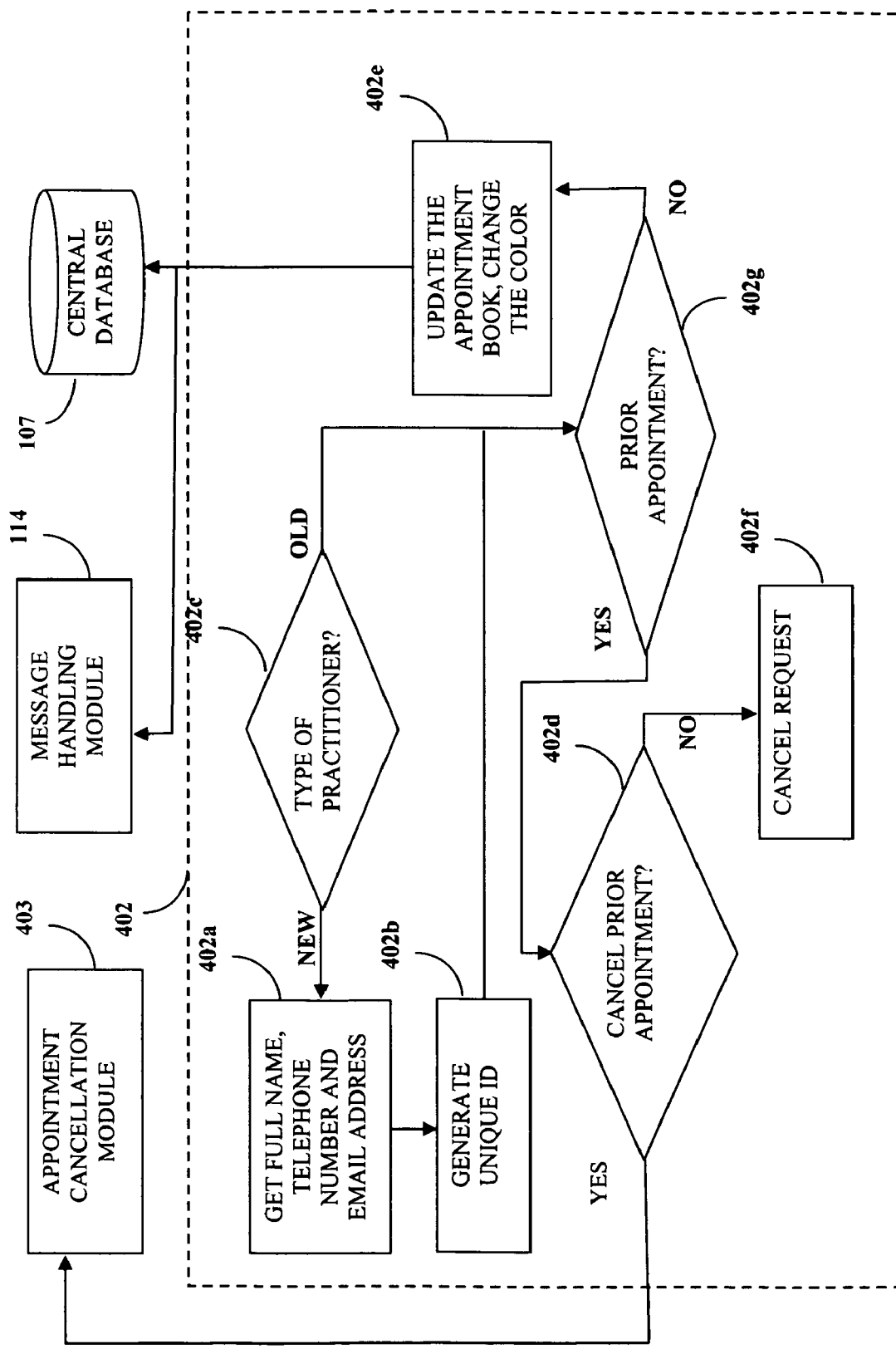
FIG. 5 illustrates the practitioner appointment addition module (PAADM) from the side.

FIG. 5 illustrates the practitioner appointment addition module (PAADM) 402. The PAADM 402 allows clients to add new appointments. Existing clients can add appointments using their "APPOINTMENT SYSTEM ID" to confirm the appointment; the remaining information, i.e., client details are retrieved from the central database 107. New practitioners are required to enter their personal details such as name, telephone number, and email address 402a. If the practitioner is a new practitioner 402c, the PAADM generates a unique identifier for the practitioner 402b.

After the practitioner has entered the login details, the PAADM 402 checks the central database 107 for prior appointments to avoid duplication of appointments. Upon confirming that no prior appointment exists 402g with the appropriate practitioner at the preferred time, the PAADM 402 reserves the time slot selected by the client in the central database 107. If the practitioner decides to cancel the appointment reservation 402d, then the PAADM cancels the appointment request 402f. Confirmation emails or SMS are sent to the practitioner and the client for the appointment through the message-handling module 114. After the appointment is stored in database 107, and the appointment book is updated to show this change, the color of the cell for the particular time slot is changed to indicate unavailability of the particular time slot 402e.

Figure 6:
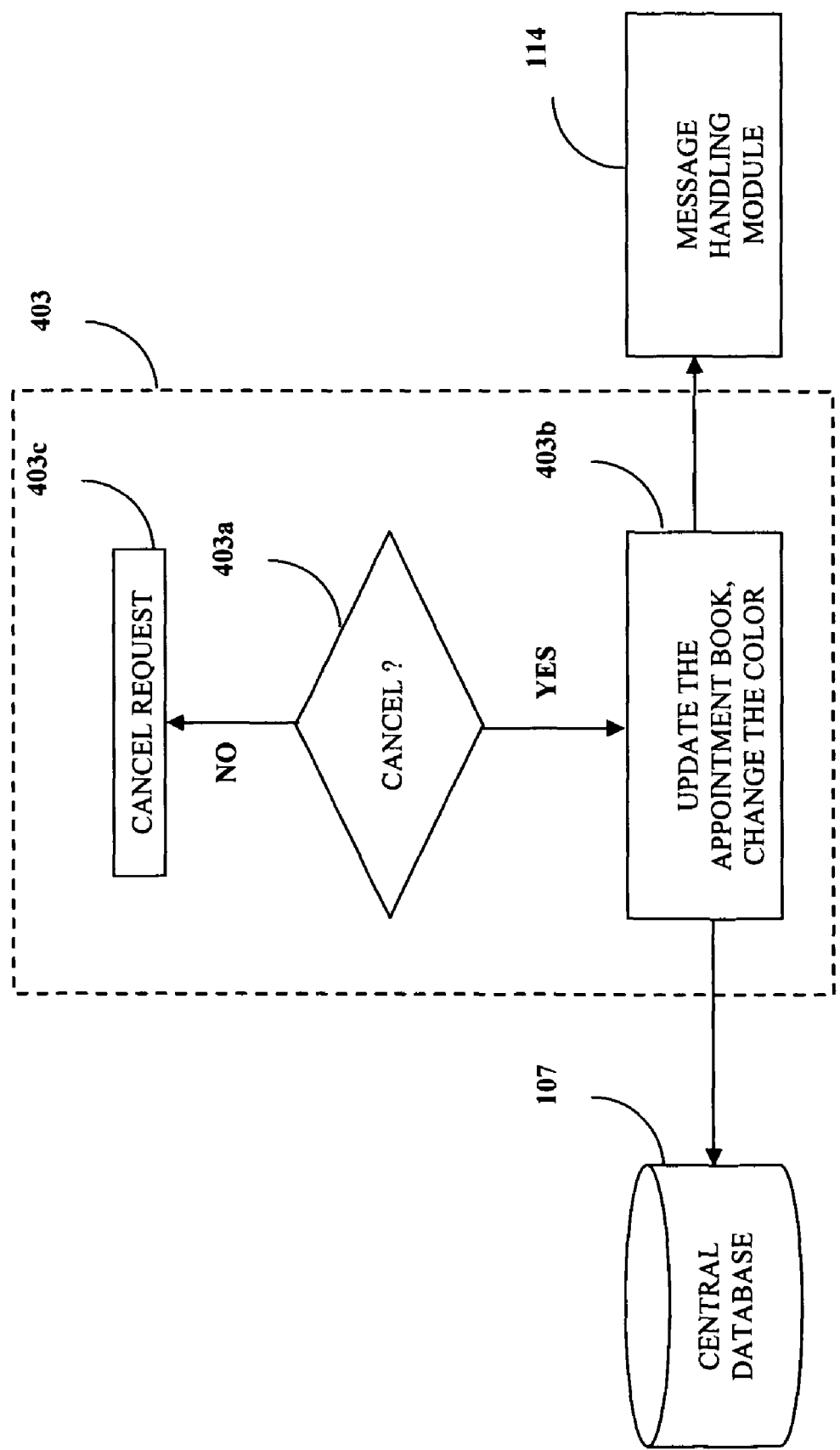
FIG. 6 illustrates the practitioner appointment cancellation module (PACM).

FIG. 6 illustrates the practitioner appointment cancellation module (PACM) 403 used by the practitioner to cancel appointments. The PACM 403 prompts the practitioner to verify the cancellation request 403a. Upon receiving confirmation from the practitioner to cancel the appointment, the PACM 403 updates the central database 107 to store the cancellation information and changes the colour of the particular time slot 403b to indicate that the appointment has been cancelled. If the client wishes to cancel the request to cancel the appointment, then the appointment cancel request is discarded 403c.

Figure 7:
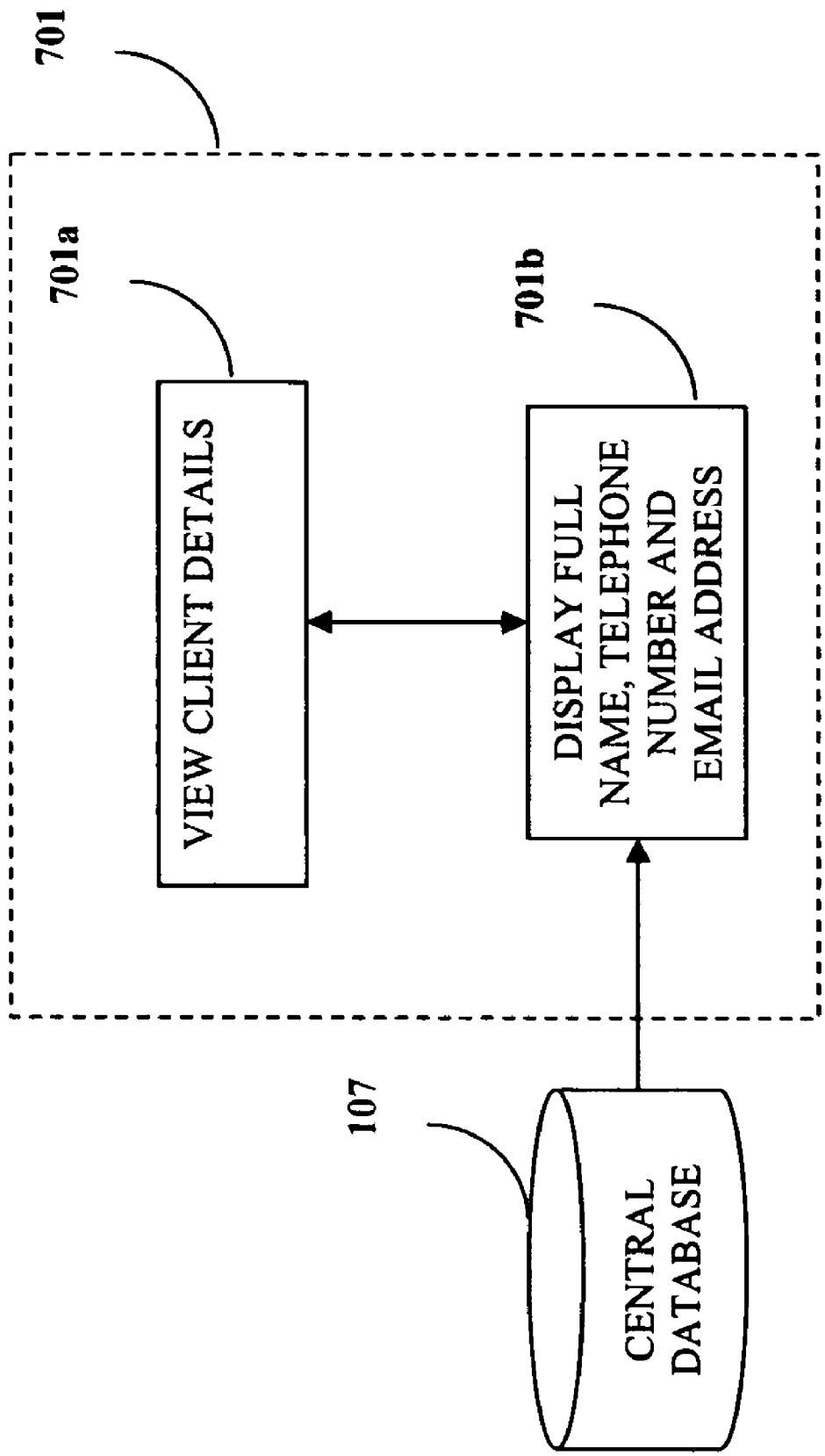
FIG. 7 illustrates the client details module for the practitioner.

FIG. 7 illustrates the client details module (CDM) 701. Each cell in the appointment box is equipped with an option for viewing the client's registered details 701a. When checked on the option to view the details, the client details module 701 retrieves the information from the central database 107 and displays the full name, telephone number and the email address of the client on the screen 701b.

Figure 8:
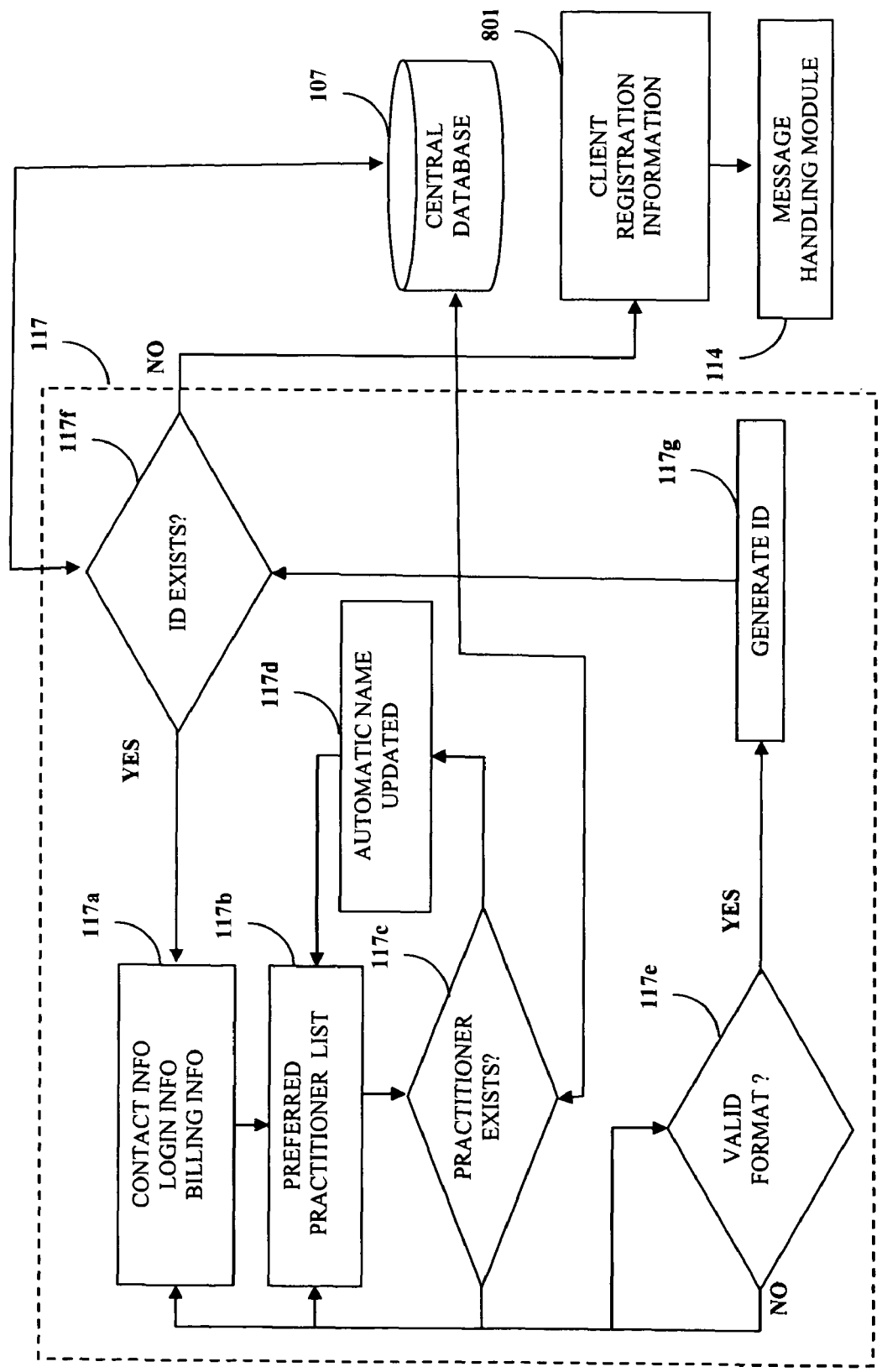
FIG. 8 illustrates the client registration module (CRM).

FIG. 8 illustrates the client registration module (CRM) 117. The client registers with the appointment system using the client registration module (CRM) 117. The client registration module 117 accepts information from the client such as contact information, account login information and billing information 117a. The client registration module 117 is responsible for receiving the registration information in a system specified format from the client 117a. The client registration module 117 also receives a list of preferred practitioners 117b from the client. If the practitioner specified by the client is not in the list presented to the client 117c, then the list is updated to contain the details of the new practitioner specified by the client 117d and is presented to the client. The client registration module 117 verifies if the information provided by the client is in an acceptable format 117e, and if it is in the prescribed format, it generates a unique username from the provided information 117g, verifies if the selected username is unique 117f, stores the information of the registered client in the central database 107, and sends the registration information 801 to the message handling module 114.

The CRM 117 verifies if the information provided by the client is in the format prescribed by the appointment system 117a. If the information provided is not in the proper format, the CRM 117 attempts to accept the information in the correct format from the client 117a. Based on the registration information provided by the client, the CRM generates a username for the client 117g. The CRM 117 checks with the central database 107 to verify that no other user with the same username exists to prevent the duplication of registration 117f in the central database 107. Upon verifying that the username is unique, the CRM 117 generates confirmation information 801 indicating the successful confirmation of the registration process. The confirmation information 801 is sent to the message-handling module 114. The message-handling module 114 uses the information provided by the CRM to send an email, SMS or voice message to the client. The client registration information is stored in the central database 107.

Figure 9:
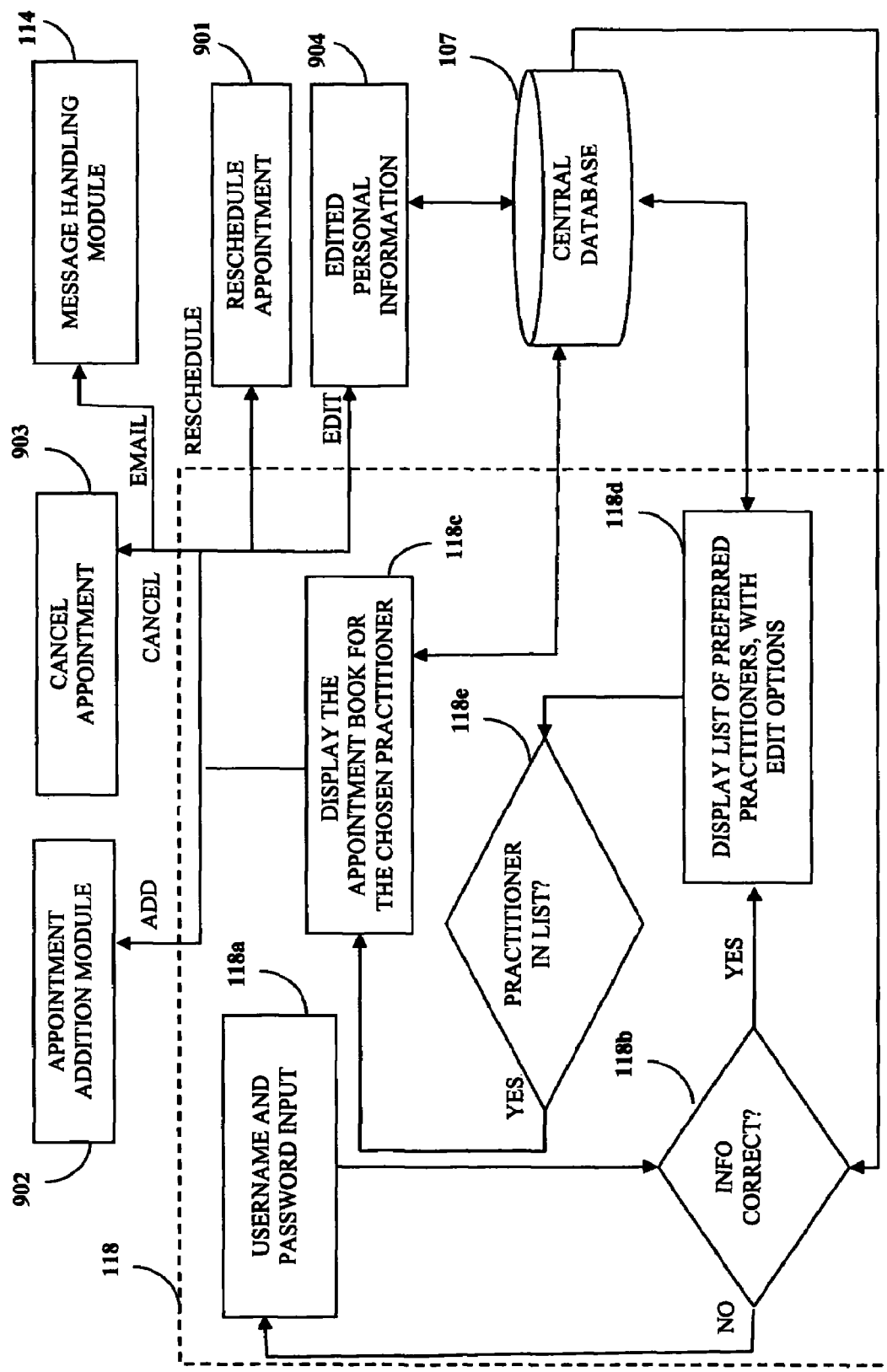
FIG. 9 illustrates the client appointment book access module (CAAM).

FIG. 9 illustrates the client appointment book access module (CAAM) 118. The client logs into the appointment book 118 using a username and password 118a. The appointment system checks if the username and password information provided is correct 118b. After a successful login, a list of preferred practitioners is displayed 118d with a link to their respective appointment books; this list is retrieved from central database. The clients will be given an option to add new practitioners to their existing list of practitioners. Once the client selects a particular practitioner, the appointment system checks if the practitioner is in the list 118e. If the practitioner's name is in the list, an appointment book for that practitioner is displayed 118c with the following features: calendar for date navigation, appointment addition option, list of unavailable appointments indicated by a color, and appointment cancellation and rescheduling options. The client can add an appointment with the practitioner using the appointment addition module 902, cancel an appointment using the cancel appointment module 903, reschedule an appointment 901, and can edit their personal information 904.

Figure 10:
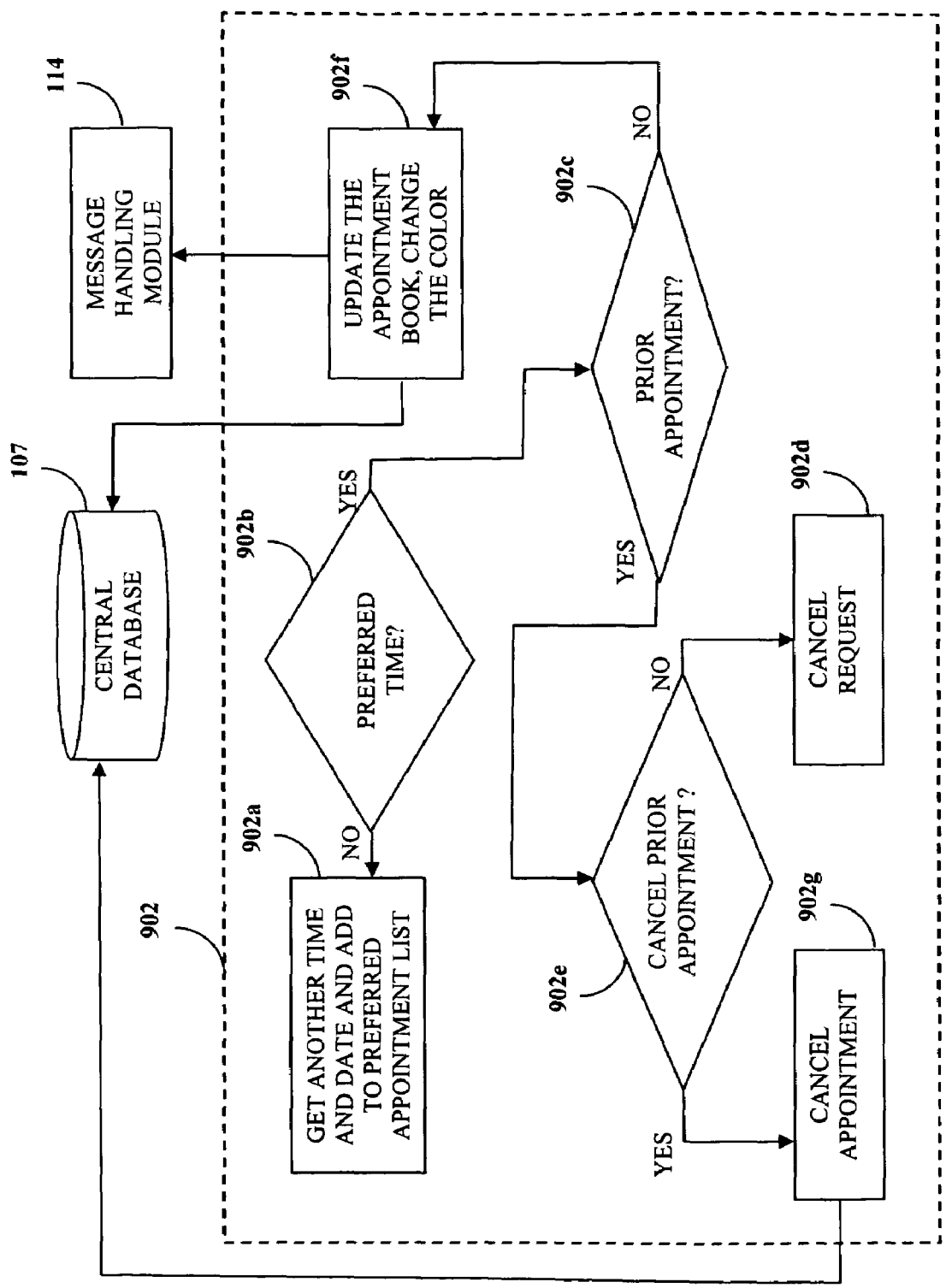
FIG. 10 illustrates the client appointment addition module (CADM).

FIG. 10 illustrates the client appointment addition module (CADM) 902. The appointment system presents the client with available time slots. The CADM 902 allows the client to create an appointment with the practitioner given the available time slots. Once the client selects a preferred time for appointment 902b, the CADM presents the client with an updated list of available appointments 902a, a confirmation message is displayed, and the client is asked if this is a preferred appointment time 902b. If the time presented to the client is the preferred appointment time, then the CADM 902 checks the database 107 for other prior appointments of the client with the same practitioner, thereby preventing duplicate appointments. If the client has prior appointments 902c with the same practitioner, then the CADM 902 asks the client if the prior appointment has to be cancelled 902e. If the client does not want to cancel the prior appointment, the present appointment request is cancelled 902d. If the client wants the prior appointment to be cancelled, then the information request is accepted 902g. If no other prior appointments exist, then the appointment is confirmed and the database 107 is updated, and the color of the cell corresponding to the particular time slot is changed 902f. The appointment addition information is passed on to the message-handling module 114, and a confirmation email is sent to both the practitioner and the client.

Figure 11:
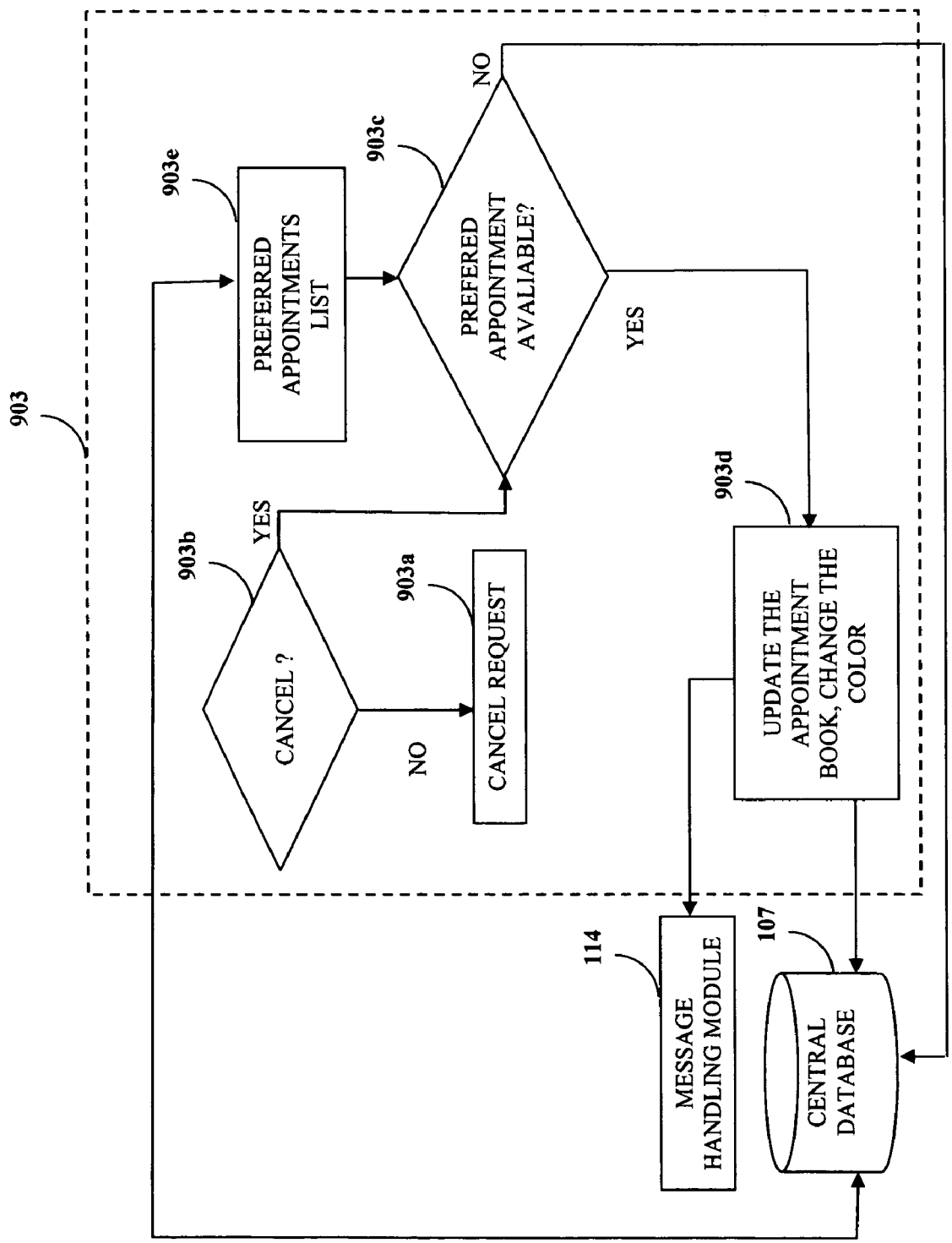
FIG. 11 illustrates the client appointment cancellation module (CACM).

FIG. 11 illustrates the client appointment cancellation module (CACM) 903. If the client wishes to cancel the appointment with the practitioner, the CACM 903 verifies the request for cancellation by prompting the client for verification 903a. If the client cancels the appointment, the CACM 903 queries the client if another appointment is to be made. If no other appointment is to be made, the request is cancelled 903b. If an appointment is to be made, the CACM 903 presents the client with a list of preferred appointment schedules 903e from which the client can select the preferred schedule of appointments 903c. The appointment book will be updated only when the preferred appointment is available. If an appointment is not available at the time slot preferred by the client, the appointment is stored in the central database 107. The client is notified by the message handling module 114 when the preferred appointment time slot is available. This allows a client to reserve an appointment with a practitioner even if the time slot is not available at the time of making the appointment.

The client can then choose to schedule another appointment with the practitioner. If the client confirms another time for appointment, or if the client wishes to cancel the appointment, then the cancellation information is passed to the message-handling module 114. The message-handling module 114 then notifies the client and the practitioner that the appointment has been cancelled. The CACM 903 updates the central database 107 about the changes and changes the color of the cell 903d corresponding to the particular time slot to indicate that the time slot is free.

Figure 12:
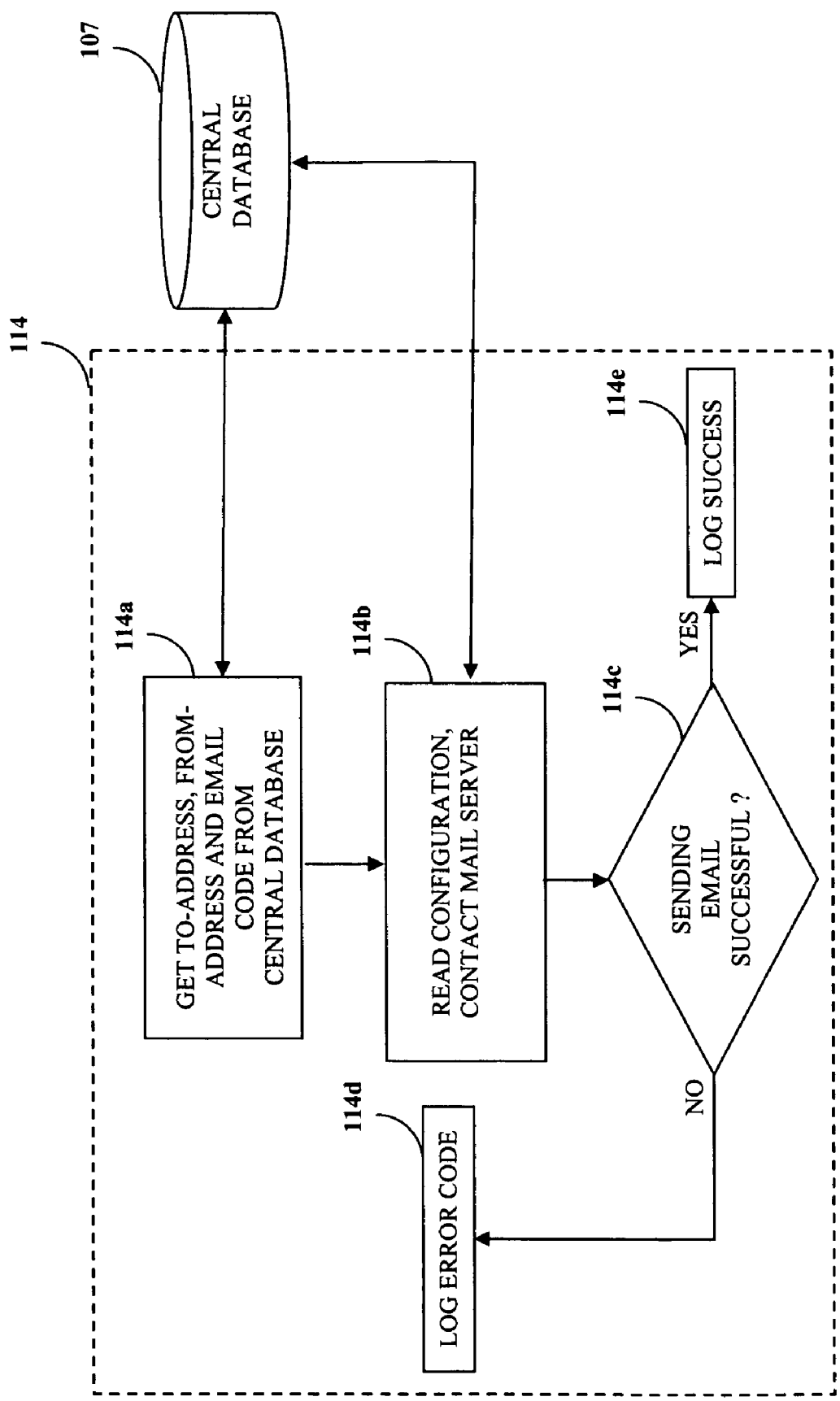
FIG. 12 illustrates the message-handling module.

FIG. 12 illustrates the message-handling module 114. The templates of the message-handling module 114 are indexed by a unique code. The template determines the basic structure for a document and contains document settings such as auto text entries, fonts, key assignments, macros, menus, page layout, special formatting, and styles. The message-handling module 114 is also provided with the "to" and "from" addresses, and the message-handling module 114 sends email using a secured mail server, or sends a SMS.

If a practitioner or client registers for the service, the message handling module 114 checks for the information provided by the practitioner or client in the centralized database 107 and retrieves the address and the email code 114a or information on other communication modes, such as SMS from the central database 107. The message-handling module 114 reads for the configuration of the message template that is to be used to send a message to a particular user and contacts the mail server 114b for mailing the relevant template or a server for dispatching SMS. If the mail has been delivered successfully, the message-handling module 114d logs that the mail was sent successfully 114e; if not, it logs an error 114d indicating the message was not sent to the concerned user.

Figure 13:
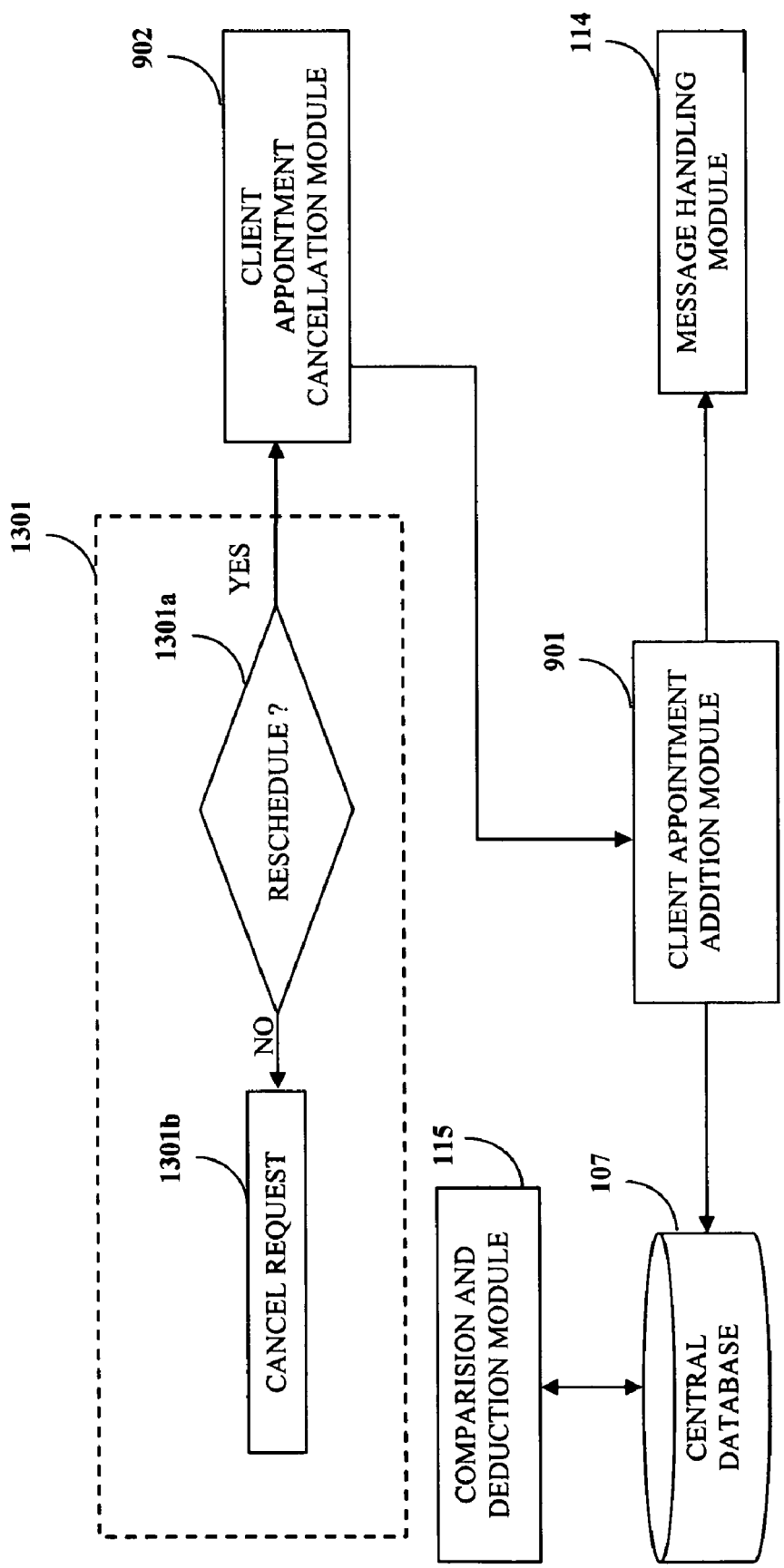
FIG. 13 illustrates the rescheduling module.

FIG. 13 illustrates the rescheduling module 1301. If the practitioner wants to reschedule a prior appointment with a client, the rescheduling module 1301 displays the time and date of prior appointment and seeks confirmation of rescheduling 1301a from the practitioner. If the practitioner does not want to reschedule the appointment, the appointment request is cancelled 1301b. If the practitioner confirms the cancellation, then a client appointment cancellation module 902 displays cancel confirmation screen to the clients. After the appointment cancellation, an option to add a new appointment is provided to the client 901. If the client desires a new appointment, the client can then schedule a new appointment and information on the new appointment is updated in the centralized database 107. The comparison and deduction module 115 deducts the change in schedule of appointments and sends a message to the message handling module 114 which in turn sends a message indicating the change in schedule of appointments to both the practitioner and the client via email, SMS or landline phone.

Figure 14:
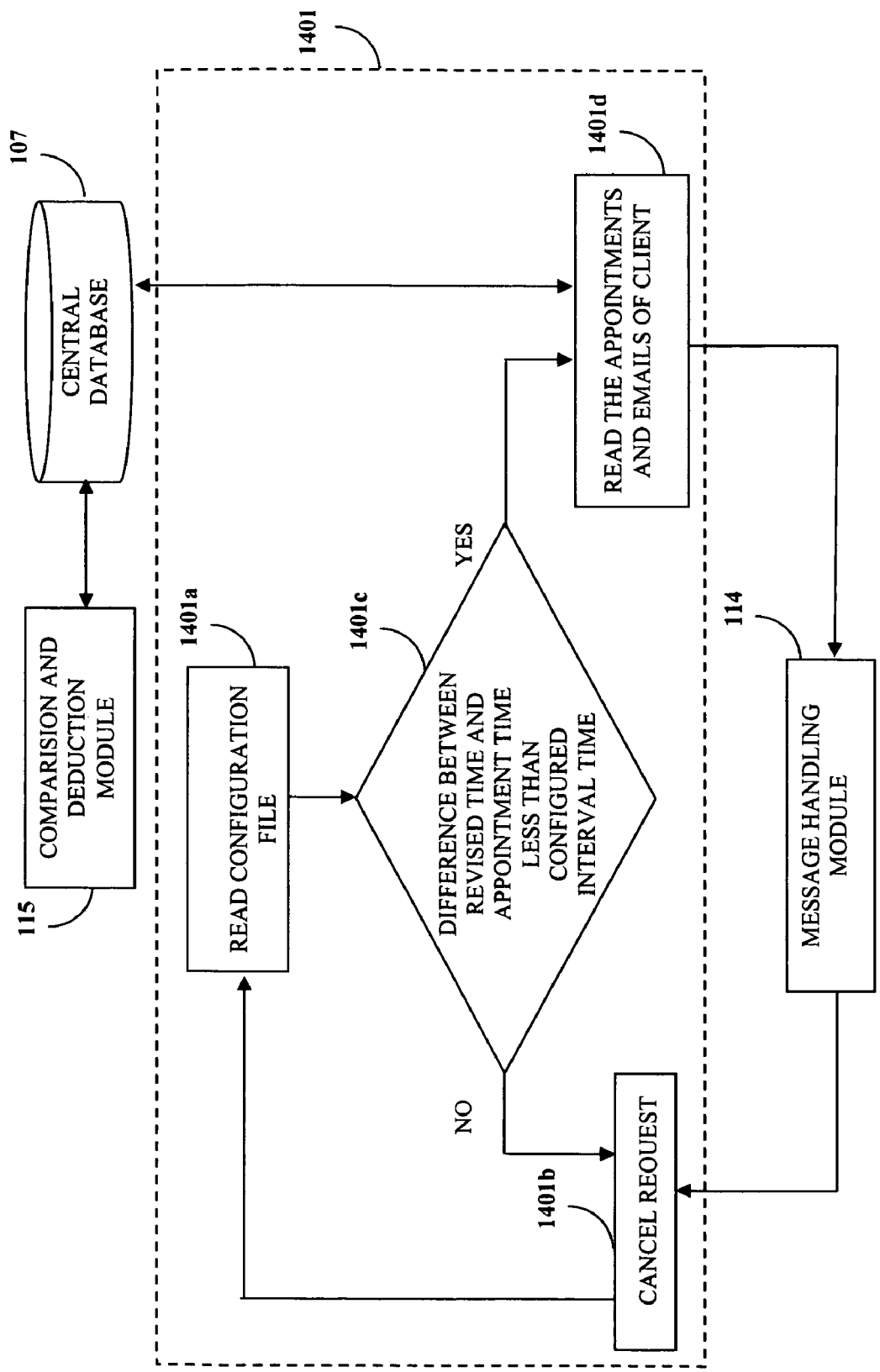
FIG. 14 illustrates the automatic remainder module.

FIG. 14 illustrates the automatic reminder module 1401. The automatic reminder module 1401 is an automatic server process that can be configured in the comparison and deduction module 115 to generate reminders for the appointments and notify clients before a predetermined time interval. The interval configuration information is obtained from the configuration file 1401a in the central database 107. This file also specifies the time interval between automatic executions of this server process. Additionally, at the time intervals specified by the configuration file, the comparison and deduction module will compare the current schedule of appointments and preferred schedule of appointments. The revised date and time is compared with the times and dates of appointments 1401d from the centralized database 107. If any difference exists between the appointments and the revised time and date 1401c, a notification email/SMS is sent by the comparison and deduction module 115 to the clients associated with the qualifying appointments via message handling module 114. If the comparison module 115 does not find any difference between the revised schedule of appointments and the preferred schedule of appointments, then the request is cancelled 1401b.

Figure 15:
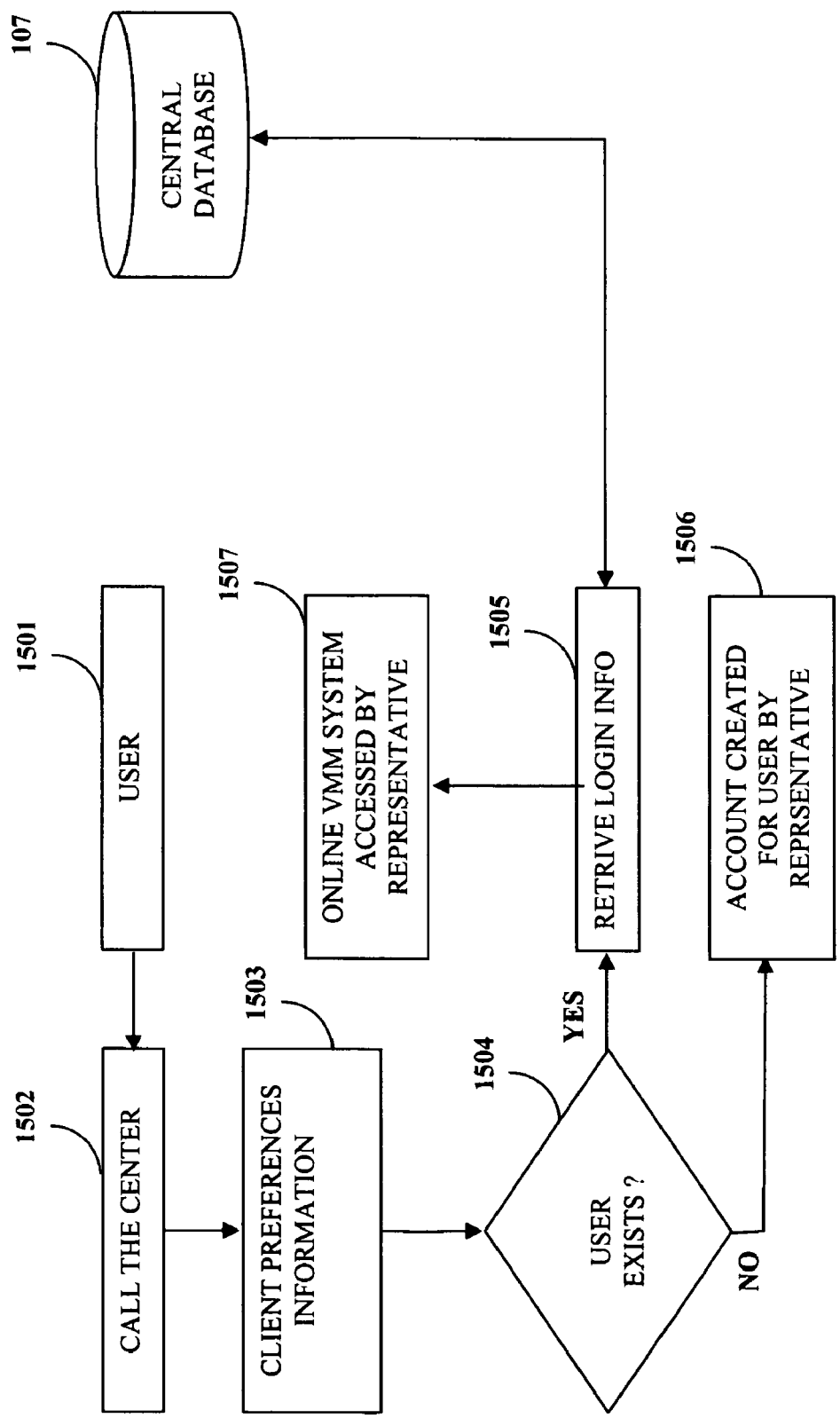
FIG. 15 illustrates the appointment additional system.

FIG. 15 illustrates the appointment additional system that assists clients of different demographic types. The appointment additional system will serve the needs of clients who do not have access to a computer, elderly clients who are not conversant with using computers, clients who need immediate assistance, and clients who do not have access to the internet. If a client 1501 wants to schedule an appointment with the practitioner, the client will contact the center 1502 and provide them with their contact information, their preferred practitioner information 1503. If the information already exists 1504 in the central database 107, then the login information is retrieved 1505 from the central database. If the login information does not exist, then the client registration information is created using module 117, and provided to the client. The client can also use the telephone service to make appointments after providing their credentials. The appointment addition procedure option can be used by those clients who are unable or unwilling to use the online appointment system via the internet. An authorized representative at the practitioner premises can then either create an account for the client 1506 or access the online appointment system on behalf of the client 1507.

Examples of practitioners in the system and method disclosed herein include, but are not restricted to doctors, lawyers, etc. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

I claim:

1. A computer implemented method for providing real-time alerts to users of an online appointment system of changes in an appointment schedule, wherein said users comprise a practitioner, a client or an administrator, wherein an appointment is scheduled between a practitioner and said client, said computer implemented method comprising the steps of:

creating a preferred appointment schedule by the users in said online appointment system by logging into the online appointment system using a unique identification data, wherein said online appointment system comprises one or more server computers and a central database;

checking said central database, by said one or more server computers, for prior appointments of said client with said practitioner and preventing duplication of appointments by said client during creation of said preferred appointment schedule by said client appointment, wherein preventing duplication of appointment schedule is prevented by allowing said user to request an appointment schedule different from a prior appointment schedule, wherein at a time, the user is allowed to request only a single appointment schedule;

recording the availability status, by said one or more server computers, for each of the users scheduled for appointment within a predetermined period from said preferred appointment time into said online appointment system;

automatically detecting, by said one or more server computers, changes to the preferred appointment schedule in real time and recording said changes in said central database in the online appointment system, wherein said changes are detected when one or more of said users change one or more preferred appointment times in said preferred appointment schedule on the online appointment system;

creating a revised appointment schedule, by said one or more server computers, based on the availability status of each of the users scheduled for appointment within said predetermined period from said preferred appointment time based on said detected change by the online appointment system and creating a revised appointment schedule in view of said detected change in said preferred appointment schedule;

comparing the status of the preferred appointment schedule against the revised appointment schedule of appointments, by said one or more server computers, when said change is detected in the preferred appointment schedule and at predetermined intervals of time, wherein said step of comparing the status of the preferred appointment schedule and constructing the revised appointment schedule of appointments is performed automatically by said one or more server computers in the online appointment system;

creating messages from said practitioner and displaying said messages to each of said clients scheduled for appointment with said practitioner;

automatically generating a plurality of alert messages, by said one or more server computers, wherein said alert messages include said change in the status or the schedule of appointments wherein the alert messages generated are communicated to the users by one or more of a short message service (SMS), a pre-recorded voice message, an electronic mail, and a call;

sending said plurality of alert messages, by said one or more server computers, in real time to affected users scheduled for appointment within said predetermined time window, indicating the change in status or the schedule of appointments;

alerting the users, by said plurality of alert messages, of newly available appointment schedule when there is a cancellation of an appointment; and generating an automatic reminder by said plurality of alert messages, by said one or more server computers, the reminder including a schedule of appointments to the users before a predetermined time interval.

2. The method of claim 1, wherein said users provide said unique identification data for verification by the online appointment system, prior to being granted direct access to the online appointment system.

3. The method of claim 1, wherein said step of creating preferred appointment schedule further comprises the step of registering each of the users using said unique identification data, and wherein information associated with each of the users is collected and stored in the online appointment system.

4. The method of claim 1, wherein after the step of creating the preferred appointment schedule, a confirmation message of the preferred appointment schedule is sent to the users of said online appointment system.

5. The method of claim 3, wherein the step of registering further comprises the steps of:

collecting a registration information from the user;

verifying if said collected registration information is in a prescribed format and generating said unique identification data from the collected information on successful verification of the collected registration information;

collecting login information from the user comprising said unique identification data and a password;

comparing said login information collected from the user with login information stored in the online appointment system;

generating an error message to the user if the login information provided by the user is incorrect; and allowing users to directly access the online appointment system if the login information provided by the user matches the login information stored in the online appointment system and allowing the user to change the preferred appointment schedule on a real time basis.

6. The method of claim 1, wherein said alert messages are short messaging service messages sent to the mobile device of the affected users, and wherein said appointment system is in communication with the mobile device via the internet.

7. The method of claim 1, wherein the online appointment system sends a prerecorded voice message played on the affected user's wireline telephone connection.

8. The method of claim 1, wherein a plurality of reminder messages regarding the appointment schedule are automatically generated and sent to the users before the scheduled appointment.

9. The method of claim 1, wherein recording the change in status or schedule of appointments from a user authorized to change said appointment schedule further comprises:

presenting a view of the appointment book to the client comprising a list of appointment schedule of the clients with a particular practitioner;

preventing duplication of appointment schedule by allowing said user to request an appointment schedule different from a prior appointment schedule, wherein at a time, the user is allowed to request a single appointment schedule;

modifying the view of the appointment book and storing the modifications in the central database; and adding, rescheduling or canceling the appointments by the user.

10. An online appointment system configured to provide real-time alerts to users of an online appointment system of changes in an appointment schedule, wherein said users comprise a practitioner, a client or an administrator, wherein an appointment is scheduled between a practitioner and said client, said system comprising:

one or more server computers and a central database configured to;

create a preferred appointment schedule by the users in said online appointment system by logging into the online appointment system using a unique identification data;

check said central database for prior appointments of said client with said practitioner and preventing duplication of appointments by said client during creation of said preferred appointment schedule by said client appointment, wherein preventing duplication of appointment schedule is prevented by allowing said user to request an appointment schedule different from a prior appointment schedule, wherein at a time, the user is allowed to request only a single appointment schedule;

record the availability status for each of the users scheduled for appointment within a predetermined period from said preferred appointment time into said online appointment system;

detect changes to the preferred appointment schedule in real time and record said changes in said central database in the online appointment system, wherein said changes are detected when one or more of said users change one or more preferred appointment times in said preferred appointment schedule on the online appointment system;

create a revised appointment schedule based on the availability status of each of the users scheduled for appointment within said predetermined period from said preferred appointment time based on said detected change by the online appointment system and creating a revised appointment schedule in view of said detected change in said preferred appointment schedule;

compare the status of the preferred appointment schedule against the revised appointment schedule of appointments when said change is detected in the preferred appointment schedule and at predetermined intervals of time, wherein said step of comparing the status of the preferred appointment schedule and constructing the revised appointment schedule of appointments is performed automatically;

create messages from said practitioner and displaying said messages to each of said clients scheduled for appointment with said practitioner;

automatically generate a plurality of alert messages, wherein said alert messages include said change in the status or the schedule of appointments wherein the alert messages generated are communicated to the users by one or more of a short message service (SMS), a pre-recorded voice message, an electronic mail, and a call;

send said plurality of alert messages, in real time to affected users scheduled for appointment within said predetermined time window, indicating the change in status or the schedule of appointments;

alert the users, by said plurality of alert messages, of newly available appointment schedule when there is a cancellation of an appointment; and generate an automatic reminder by said plurality of alert messages, the reminder including a schedule of appointments to the users before a predetermined time interval.

11. The online appointment system of claim 10, wherein the registration module further comprises a practitioner registration module and a client registration module.

12. The online appointment system of claim 10, wherein the appointment module further comprises: a practitioner appointment book creation module, a practitioner appointment book access module, a practitioner appointment addition module, a practitioner appointment cancellation module, a client appointment book access module, a client appointment addition module and a client appointment cancellation module.

13. The method of claim 1 further comprises providing visual indication of an unavailable date and time based on said comparison of the status of the preferred appointment schedule against the revised appointment schedule, wherein said visual representation is provided in an online appointment book accessible by the users, and wherein said visual indication comprises a colored cell corresponding to said unavailable date and time in said appointment book.

14. The online appointment method of claim 1, wherein said step of creating said preferred appointment schedule comprises:

presenting said client with a list of available appointment schedules;

receiving a client selection from said list of available appointment schedules;

receiving a preferred time slot from said client for an appointment;

notifying said client on availability of said appointment during said preferred time slot; and canceling said client selected appointment schedule selected from said list of available appointment schedules on acceptance of said appointment during said preferred time slot.

* * * * *